US012607596B2

(12) United States Patent
Larrieu

(10) Patent No.: US 12,607,596 B2
(45) Date of Patent: Apr. 21, 2026

(54) NANOSTRUCTURE PLATFORM FOR CELLULAR INTERFACING AND CORRESPONDING MANUFACTURING METHOD

(71) Applicant: CENTRE NATIONAL DE LA RECHERCHE SCIENTIFIQUE (CNRS), Paris (FR)

(72) Inventor: Guilhem Larrieu, Cessales (FR)

(73) Assignee: CENTRE NATIONAL DE LA RECHERCHE SCIENTIFIQUE (CNRS), Paris Cedex (FR)

( * ) Notice: Subject to any disclaimer, the term of this patent is extended or adjusted under 35 U.S.C. 154(b) by 347 days.

(21) Appl. No.: 18/254,881

(22) PCT Filed: Dec. 3, 2021

(86) PCT No.: PCT/EP2021/084283
§ 371 (c)(1),
(2) Date: May 30, 2023

(87) PCT Pub. No.: WO2022/117880
PCT Pub. Date: Jun. 9, 2022

(65) Prior Publication Data
US 2024/0011940 A1 Jan. 11, 2024

(30) Foreign Application Priority Data

Dec. 4, 2020 (FR) ........................................ 2012720
Oct. 22, 2021 (FR) ..................................... 2111269

(51) Int. Cl.
*G01N 27/414* (2006.01)
(52) U.S. Cl.
CPC ..... *G01N 27/4146* (2013.01); *G01N 27/4148* (2013.01)

(58) Field of Classification Search
CPC ......... A61B 5/262; A61B 5/685; A61B 5/279; A61B 5/263; A61B 2562/125;
(Continued)

(56) References Cited

U.S. PATENT DOCUMENTS

| 7,905,013 | B2 | 3/2011 | Zhang et al. | |
| 2004/0072994 | A1* | 4/2004 | Herr ....................... | B82Y 30/00 |
| | | | | 428/408 |

(Continued)

FOREIGN PATENT DOCUMENTS

| WO | 2017127551 A1 | 7/2017 |
| WO | 2019110485 A1 | 6/2019 |

(Continued)

OTHER PUBLICATIONS

Casanova A et al: "Nanowire based bioprobes for electrical monitoring of electrogenic cells", Journal of Physics: Condensed Matter, Institute of Physics Publishing, Bristol, GB, vol. 30, No. 46, Oct. 29, 2018 (Oct. 29, 2018), p. 464001, XP020332027, ISSN: 0953-8984, DOi: 10.1088/1361-648X/AAE5AA.
(Continued)

*Primary Examiner* — Vongsavanh Sengdara
(74) *Attorney, Agent, or Firm* — S.J. INTELLECTUAL PROPERTY LTD.

(57) ABSTRACT

The invention relates to a method for manufacturing a platform for cellular interfacing, the platform being manufactured over a predetermined bulk substrate, the method being a top-down method.
According to the invention, such a method comprises the following steps in order:
creating (E10) vertical nanowires over the bulk substrate;
depositing (E30) a Si layer
creating (E40) the access lines for accessing the nanowires;
(Continued)

selective silicidation (E50) of the access lines and of the nanowires;

metal structuring (E60) of the access lines;

depositing (E60) an insulating layer for liquid measurement;

selective removal (E70) of the insulating layer on the nanoprobes.

8 Claims, 10 Drawing Sheets

(58) Field of Classification Search

CPC .... A61B 2562/0209; A61B 2562/0285; G01N 33/4836; G01N 33/48728; G01N 27/4146; G01N 27/4148; B82Y 30/00; B82Y 5/00

See application file for complete search history.

(56) References Cited

U.S. PATENT DOCUMENTS

| | | | |
|---|---|---|---|
| 2007/0187840 | A1 | 8/2007 | Dell'Acqua-Bellavitis et al. |
| 2013/0023115 | A1* | 1/2013 | Fan .................... H01L 21/76895 |
| | | | 438/586 |
| 2014/0193982 | A1* | 7/2014 | Yi ...................... H01L 21/02112 |
| | | | 438/763 |
| 2015/0325852 | A1* | 11/2015 | Wang .................... H01M 4/386 |
| | | | 429/231.95 |
| 2018/0169403 | A1 | 6/2018 | Park |
| 2019/0021619 | A1* | 1/2019 | Dayeh .................... B82Y 15/00 |
| 2020/0109049 | A1* | 4/2020 | Giordano ........... G01N 27/4146 |
| 2021/0057757 | A1* | 2/2021 | Brewer ................. H01M 4/386 |
| 2021/0093246 | A1* | 4/2021 | Dayeh ...................... A61B 5/25 |

FOREIGN PATENT DOCUMENTS

| | | |
|---|---|---|
| WO | 2019217553 A2 | 11/2019 |
| WO | 2020035570 A1 | 2/2020 |

OTHER PUBLICATIONS

Jacob T. Robinson et al: "Vertical nanowire electrode arrays as a scalable platform for intracellular interfacing to neuronal circuits", Nature Nanotechnology, vol. 7, No. 3, Jan. 10, 2012 (Jan. 10, 2012), pp. 180-184, XP055248720, London ISSN: 1748-3387, DOi: 10.1038/nnano.2011.249.

Liu Ren et al: "High Density Individually Addressable Nanowire Arrays Record Intracellular Activity from Primary Rodent and Human Stem Cell Derived Neurons", Nano Letters, vol. 17, No. 5, May 10, 2017 (May 10, 2017), pp. 2757-2764, XP055828877, us.

Lee Seulah et al: "Formation of Vertically Aligned Cobalt Silicide Nanowire Arrays Through a Solid-State Reaction", IEEE Transactions On Nanotechnology, IEEE Service Center, Piscataway, NJ, US, vol. 12, No. 5, Sep. 1, 2013 (Sep. 1, 2013), pp. 704-711, XP011525833, ISSN: 1536-125X, DOi: 10.1109/TNANO.2013.2268578.

* cited by examiner

[fig 1]
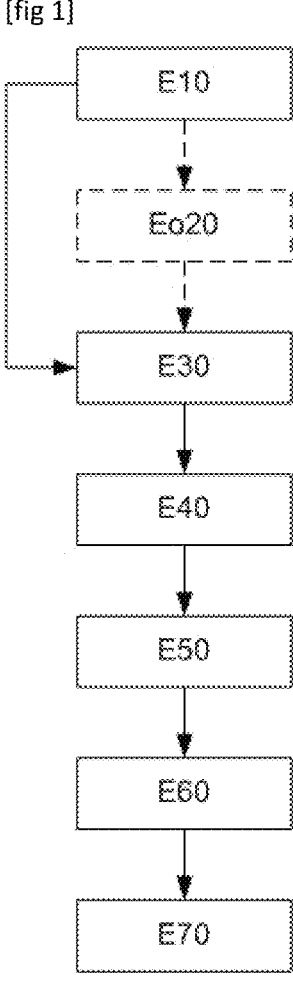
[fig 2]
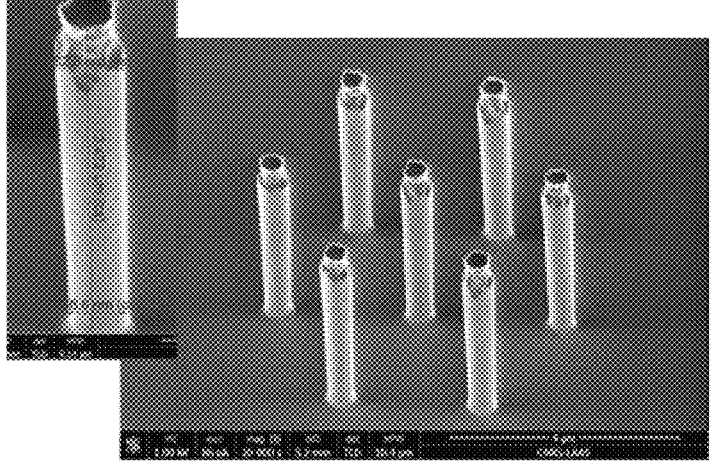

[fig 3]
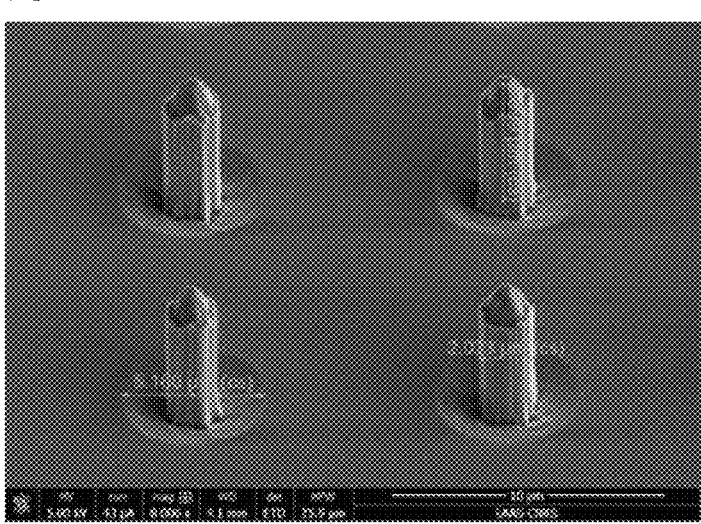
[fig 4]
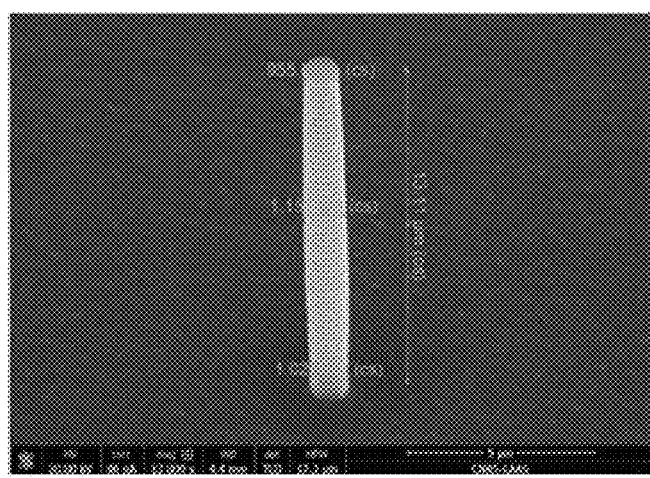

[fig 5]
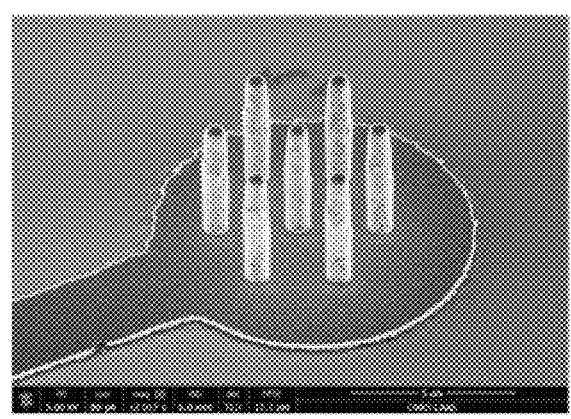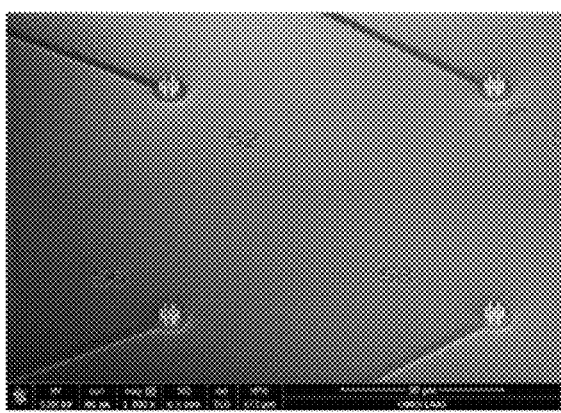
[fig 6]
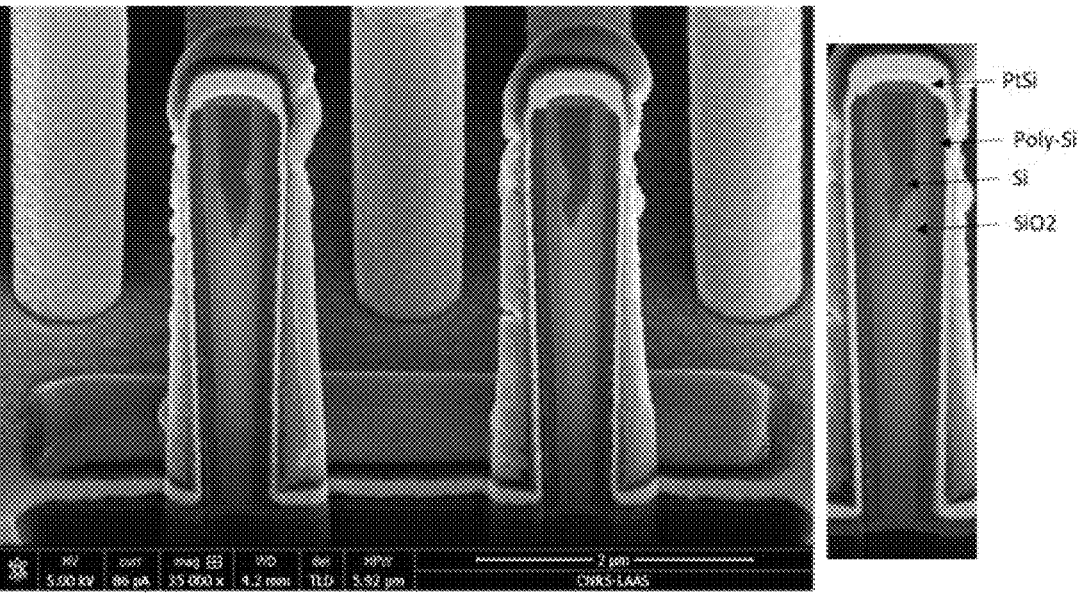

[fig 7]
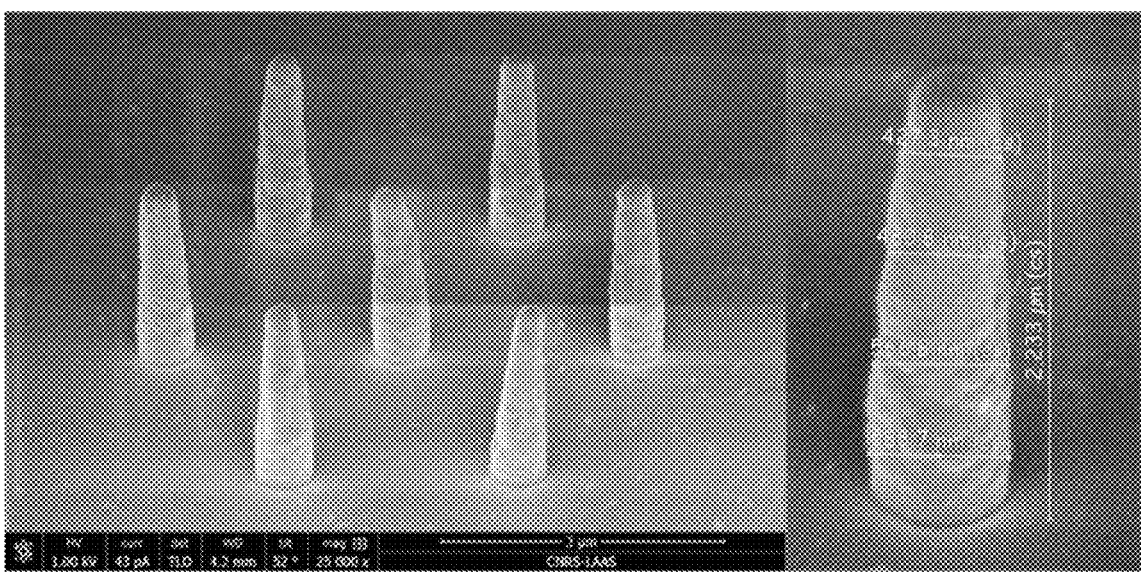
[fig 8]
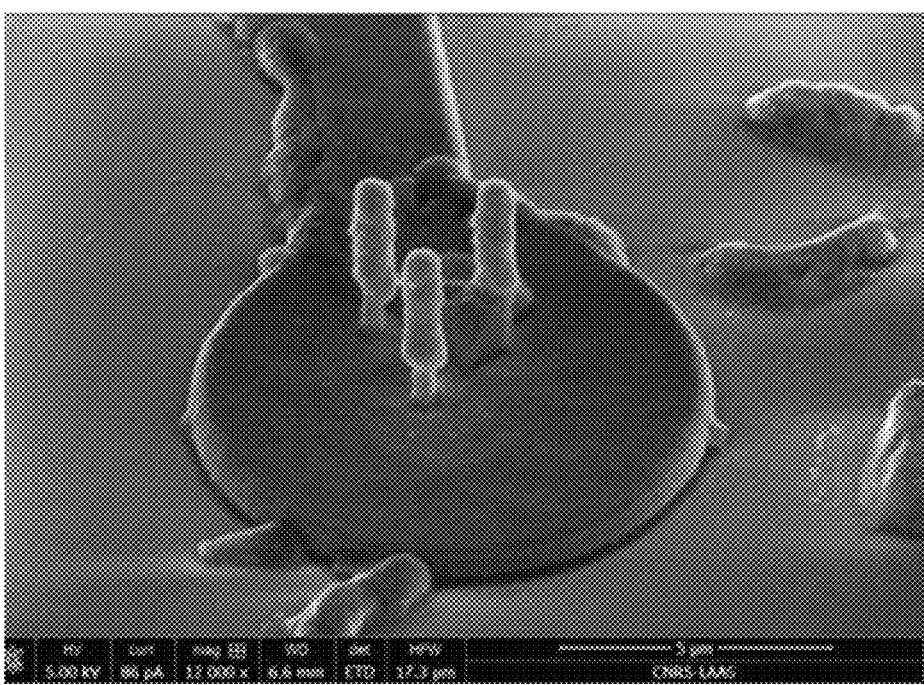

[fig 9]
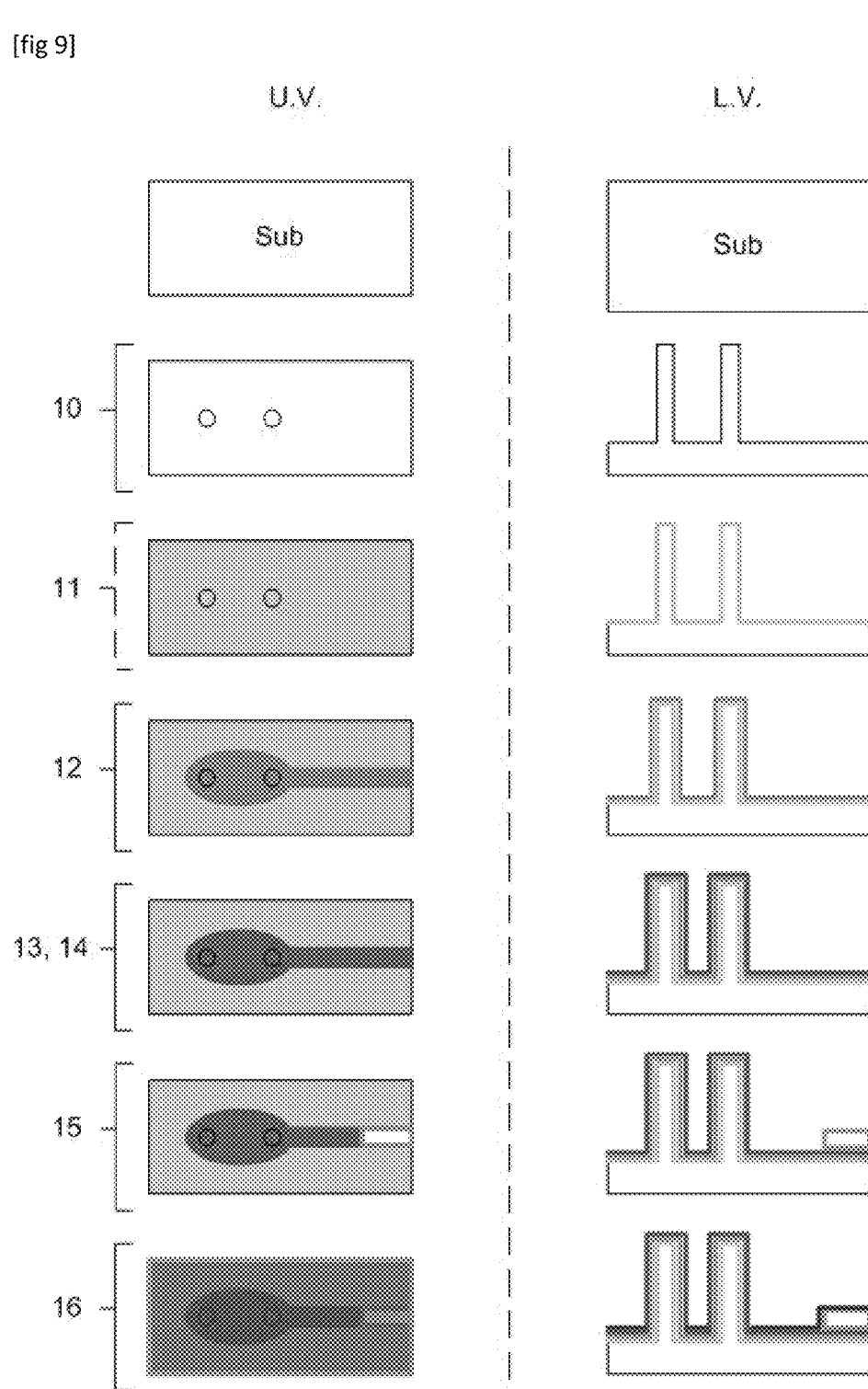

[fig 10]
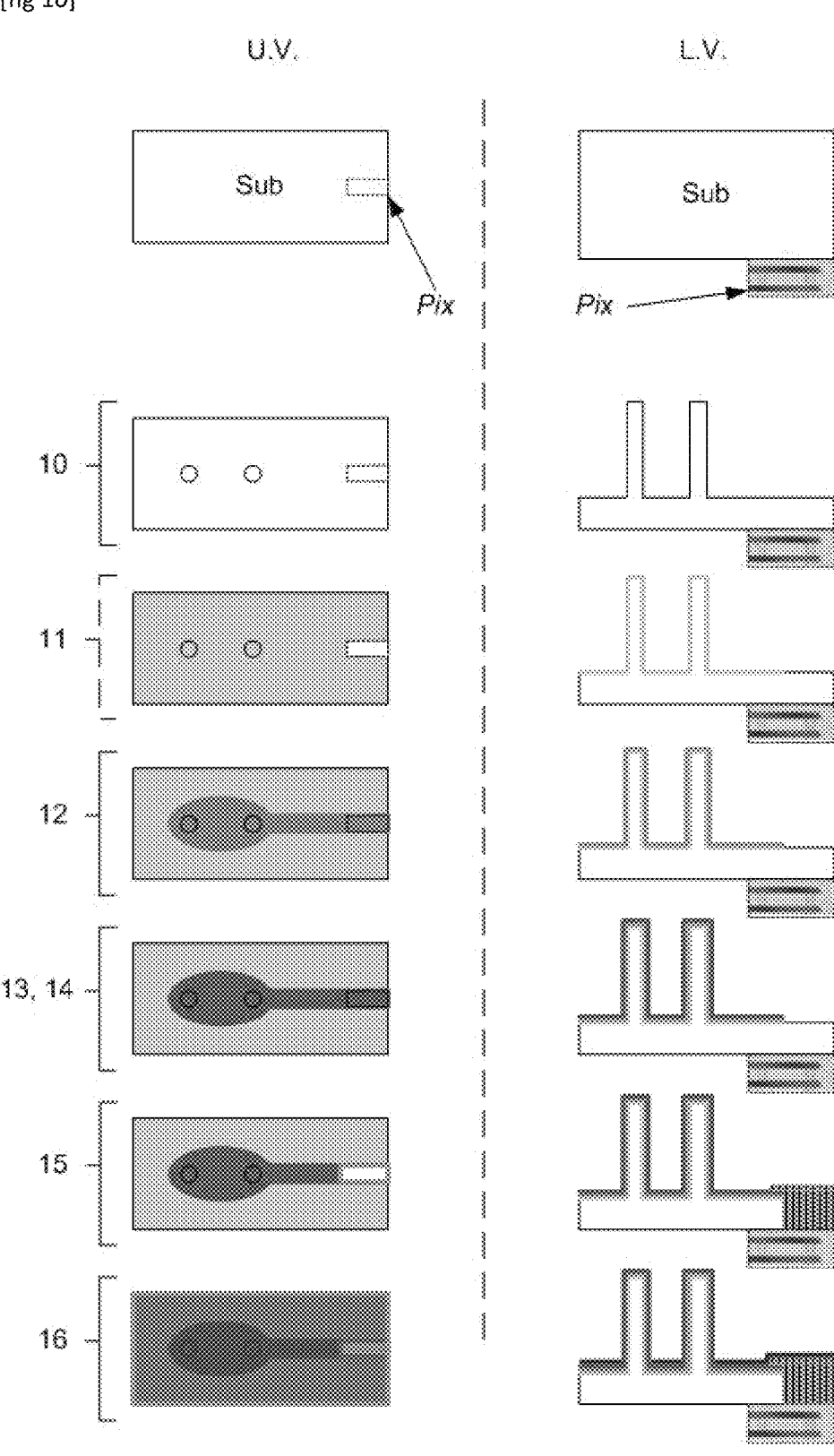

[fig 11]
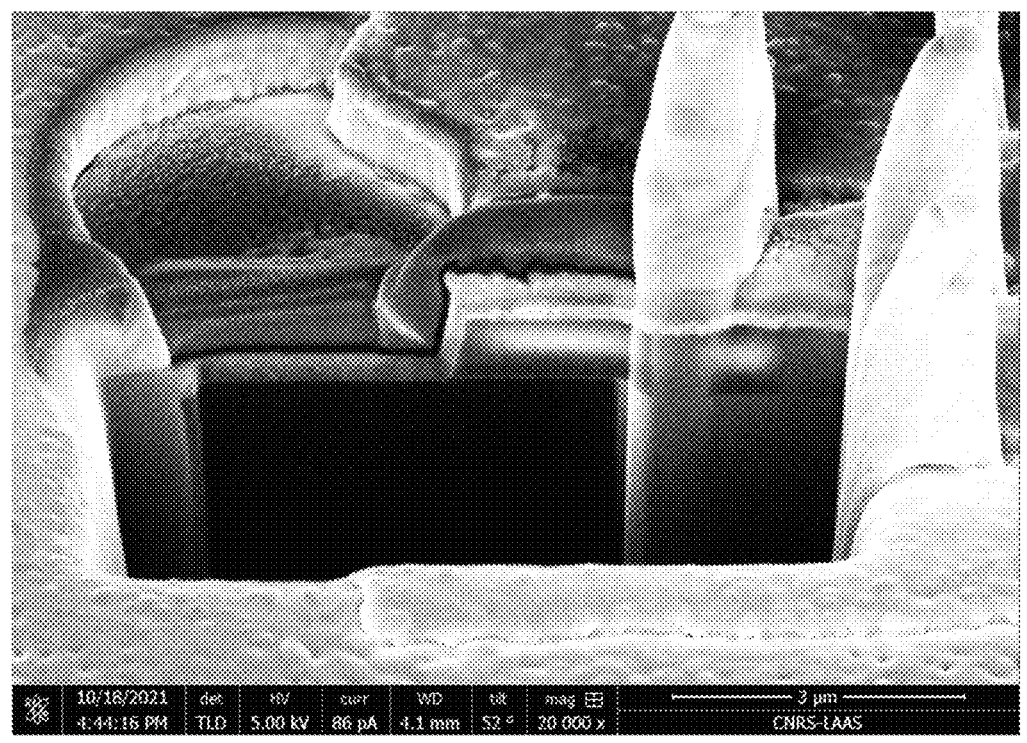
[fig 12]
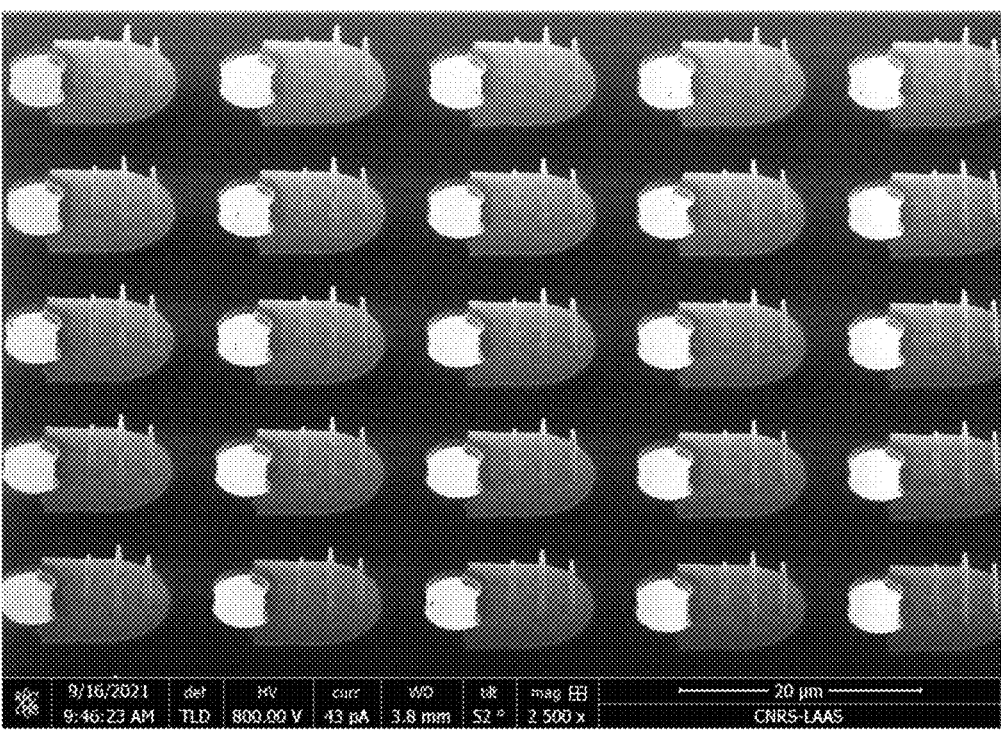

[fig 13]
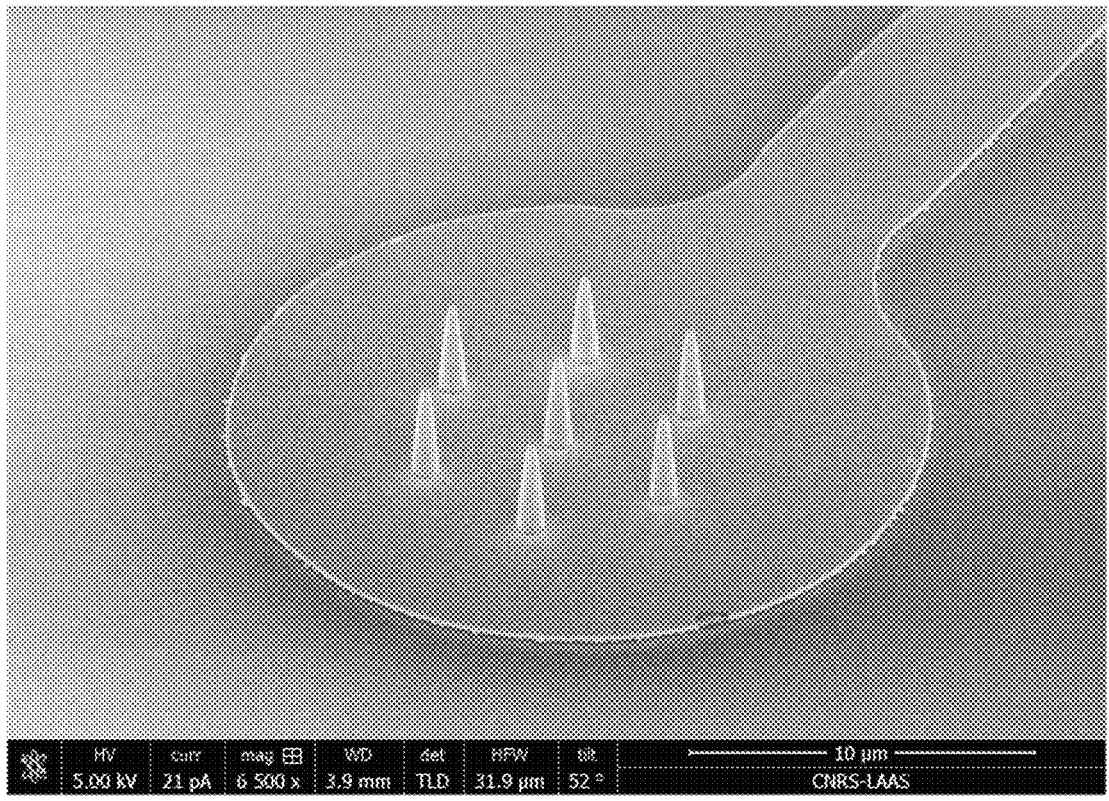
[fig 14]
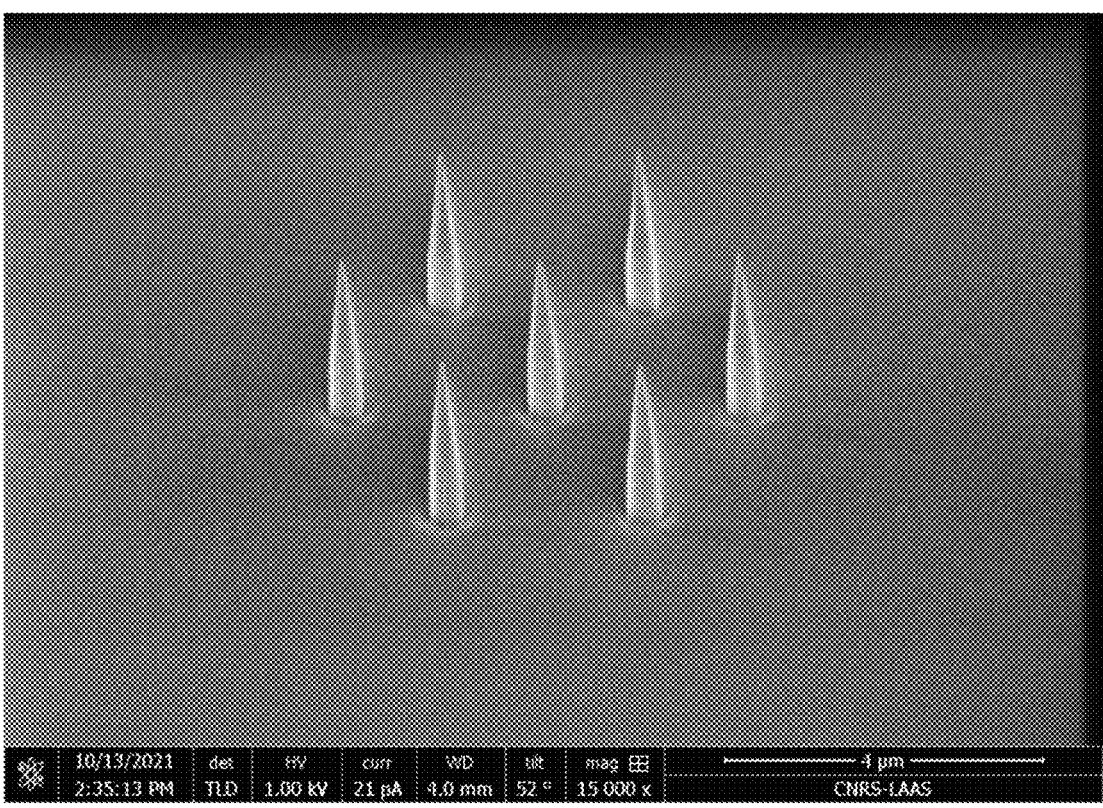

[fig 15]
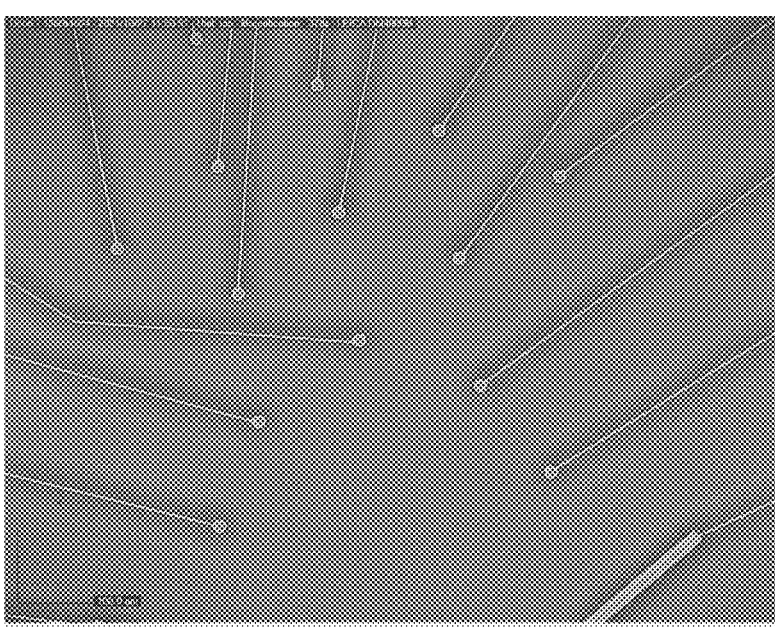
[fig 16]
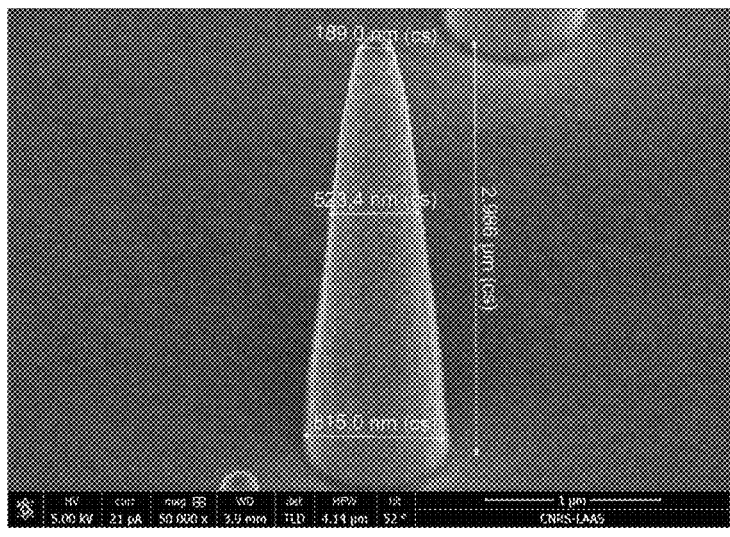

[fig 17]
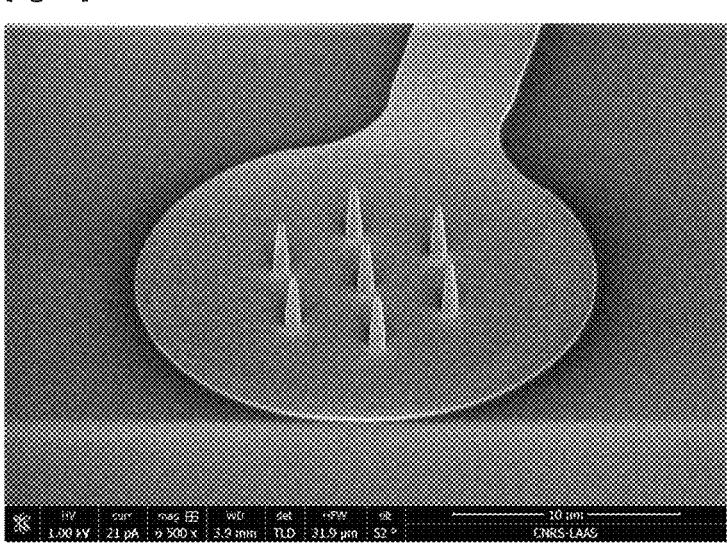

NANOSTRUCTURE PLATFORM FOR CELLULAR INTERFACING AND CORRESPONDING MANUFACTURING METHOD

1. FIELD

The present technique relates to the fields of nanostructures and more particularly nanostructures intended for capturing biological phenomena. More particularly, the present technique relates to a platform for measuring and stimulating cells of the neural type or cardiomyocytes, and more generally any type of cells whose electrical or electrophysiological activity can be captured, which may be dissociated cell cultures (neurons, muscle cells, heart cells . . . ), organ tissue cultures or tissue slices (hippocampus, cerebellum, spinal cord, retina, . . . ) or cell-based organoids derived from strain cells. The present technique may also be implemented in vivo, for interfacing with cells at the level of functional organs.

2. PRIOR ART

The study of the electrophysiological states of the excitable cells (neurons, cardiomyocytes) and of the groups and networks formed by these cells allows enhancing the understanding of the functional and pathological states of the organs to which these cells relate. The electrophysiological state of the cell is conventionally studied with calcium imaging, which requires the use of a chemical component likely to disrupt cellular development and activity as well as miniaturised devices enabling the direct measurement of electrical potentials (or currents) at the cellular level. These probes which offer a specific affinity with the cells, i.e. outer membranes and in some cases an access to the interior (cytoplasm) of the cell, thereby enabling the measurements of the variations of potentials of one or more cell(s) in a network of cells. These probes comprise "patch-clamps" with glass micropipettes, networks of microelectrodes/nano-electrodes (MEAs/NEAs), and planar or nanowire-based field-effect transistors (FETs), and with different materials, such as networks of vertical nanowires made of silicon (Si), platinum (Pt), iridium oxide (IrOx), etc.

Glass micropipette electrodes with a "patch-clamp" process have conventionally been used. They allow carrying out good quality measurements, but on the one hand they cannot be used simultaneously for a large number of cells (due to the difficulty of implementing these probes) and on the other hand they lead to the death of the cells in the relatively short term, due to the penetration of the micropipette within the cell.

More recently, technological developments have made it possible to develop networks of planar microelectrodes which are on the way to becoming standard platforms for the study of the electrophysiological responses of cellular networks over long periods (several weeks). These networks of microelectrodes have the advantage of not altering the envelope of the cells and therefore of not causing the premature death thereof. However, planar microelectrode arrays have the drawback of having a relatively large size compared to that of a cell (therefore capture information originating from multiple cells at the same time). Still more importantly, the measurement of potential variations is an important piece of data that should be measured. However, the main problem which lies with these existing networks and these platforms is the weak cell/microelectrode interaction which induces signals (action potential) which are very degraded in terms of amplitude and therefore difficult to interpret.

Platforms and networks based on microelectrodes have been the subject of considerable technological developments, such as those disclosed in the documents U.S. Pat. No. 7,905,013, WO2017127551 and WO2019110485.

In U.S. Pat. No. 7,905,013, a dielectric layer over a conductive layer is selectively wet etched forming contact holes with inclined walls in the dielectric layer and exposing regions of the conductive layer.

Afterwards, neural interfaces of IrOx nanowires are developed starting from the exposed regions of the conductive layer. Each of the IrOx nanowire neural interfaces has a cross-section comprised between 0.5 and 10 micrometres, an average height comprised between about 10 nanometres (nm) and about 10 micrometres ($\mu$m), and an average proximal end diameter in a range from about 1 nm to about 1 $\mu$m. Zhang reports clusters of probes on chips ranging from 1 to 100 square millimetres. Each of the groups comprises from 2 up to 12 electrodes, located within a group diameter comprised between 5 and 50 micrometres, the number of groups over the chip being comprised between 2 and 100.

In WO2017127551, a neural probe sensor network is described on an insulating substrate. Such a network comprising a substrate with a metallic pattern thereon. A network of probes of semiconductor vertical nanowires extends at a distance from the substrate, have been structured in a semiconductor active layer deposited over this insulating substrate. The probes are electrically addressed, individually, through the metal pattern. The metallic pattern is insulated with a dielectric, and the base portions and the stems of the nanowires are also preferably insulated. This platform allows stimulating the cells that take place over the nanowires individually.

In WO2019110485, a platform comprising both nanofets and nanowires is described. This platform is manufactured according to a top-down process. More particularly, the method for manufacturing such a platform assumes the use of a base comprising a substrate over which a 1 $\mu$m layer of silicon dioxide (SiO2) is deposited, itself covered with a 4-5 $\mu$m thick monocrystalline silicon (Si) layer. It is this last monocrystalline silicon layer which is subjected to a treatment enabling the creation of both the nanowires and the nanofets. The technique proposed in WO2019110485 is effective as it allows addressing the problems posed in particular by the techniques of the prior art (U.S. Pat. No. 7,905,013 and WO2017127551). On the other hand, the technique of WO2019110485 suffers from a problem of homogeneity related to the monocrystalline silicon (Si) layer. Indeed, the Inventors have noticed that, under operational conditions, the active layer can experience, in some circumstances, a thickness variation of more or less 500 nm, i.e. about ten percent of the overall theoretical thickness of the active layer. Such a variation considerably affects the manufacturing yields of the platforms with the technique proposed in WO2019110485. In addition, this approach is possible only by using a very specific substrate (silicon-on-insulator), with an active layer with a fixed thickness.

As regards implementation on CMOS, the document US20180169403A1 discloses the commonly implemented technique. In this document, the approach is the direct structuring of each pixel via a layer, added above the CMOS, supposedly with a finite thickness, which is structured afterwards, determining the final length of the nanostructures. In addition to the aforementioned problems, this also introduces constraints on the methods used to be compatible with the metal pixel leading to the CMOS. It may also introduce reliability issues to the CMOS circuit because the metal connections leading thereto are not protected (since they are structured as such).

All these approaches also suffer from the inhomogeneity of dry etching rate for creating the nanostructures: at the substrate level, the etching rate is always quicker over the peripheral areas than at the centre introducing hundreds of nanometres of "over-etching" at the edge compared to the centre. Thus, over a layer with a definite thickness, it is not possible to reach the target height all over the substrate.

In summary, the approach followed by a person skilled in the art consists in structuring the vertical nanoelectrodes in a layer with a definite thickness, this thickness inducing the length of the nanostructures. This approach, as set out before, faces many problems like the introduction of a uniform active layer (often associated with the use of a very specific and expensive substrate), structuring of the layer in a homogeneous manner, the strong interaction between the creation of the interface layer over the nanostructures and the metallic accesses thereof (or of the CMOS pixels)

Hence, it is necessary to provide a manufacturing technique that can be implemented on a variety of substrates that allows obtaining platforms that ensure that measurements and observations can be performed reliably, while guaranteeing the mid-term or long-term survival of the cell cultures and guaranteeing manufacturing repeatability ensuring a high yield, a perfect compatibility with conventional micro-technology techniques available in foundries, while simplifying the method and therefore leading to a decrease in the manufacturing costs.

3. SUMMARY

The present technique has been built on the basis of these problems of the prior art. More particularly, the present technique relates to a method for manufacturing a platform for cellular interfacing, the platform being manufactured over a predetermined bulk substrate, with no active layer. The proposed technique is remarkable in that the method is of the top-down type, and that over the predetermined bulk substrate, with no active layer, it comprises the following steps in order:

creating vertical nanowires over the substrate;
depositing an insulating dielectric layer, where necessary;
depositing a silicon layer;
creating access lines for accessing the nanowires;
silicidation of the access lines and of the nanowires;
metal structuring of the access lines;
depositing an insulating layer for measurement in a liquid environment;
selective removal of the insulating layer on the nanowires.

Thus, it is possible to provide a platform whose properties are stable and repeatable. Indeed, to the extent that the vertical structuring of the substrate takes place before the creation of the access lines (which is performed by deposition of silicon for example), it is possible to control both the height of the vertical nanowires and the thickness of the access lines for accessing the vertical nanowires. Thus, the control of these two parameters allows having a platform whose characteristics are known and constant during manufacture.

According to a particular feature, the predetermined bulk substrate belongs to the group comprising: a transparent substrate (for example quartz, molten silica), a flexible substrate (for example polyimide), silicon (or any other semiconductor), a passivation layer (SiO, SiN) of a CMOS electronic circuit.

Thus, it is possible to manufacture a platform suited to specific needs. In particular, it is possible to have a platform over a transparent substrate such as quartz, by carrying out a vertical structuring directly over the quartz substrate, without the need for the addition of a Si type active layer to be nanostructured, as in the prior art. It is also possible to provide a platform directly built on CMOS-type electronics, so that the electrical signals of the platform are processed, in whole or in part, directly by this platform without direct structuring of the pixels, as in the prior art.

According to a particular feature, the step of creating the nanowires over the predetermined bulk substrate comprises:

A photolithography step, comprising a local deposition of a resin pattern which serves as a protective mask; and
A step of dry etching by ion bombardment allowing obtaining vertical nanowires on the substrate, at the desired height.

Thus, it is possible to easily define the different structuring schemes of the vertical nanowires over the platform, while effectively controlling the final height of these nanowires. When the substrate is electrically-conductive (Si for example), the nanostructuring step is followed by full-wafer deposition of an insulating layer (SiO2, . . . ) with a thickness comprised between 20 nm and 200 nm, which thickness allows meeting the subsequent deposition objectives of the other compounds, while guaranteeing the usability of the platforms with respect to the studied or stimulated biological materials.

Moreover, there may be an intermediate layer (called hard mask) during the etching step. This layer is structured by a first etching of the patterns made of resin (thereby defining a mask for a second etching of the nanowires). This enables the use of patterns that resist etching more than the resin and thus obtaining longer nanowires more easily.

According to a particular feature, the step of creating the access lines to the nanowires comprises:

A step of depositing a full-wafer polysilicon layer, by CVD;
A photolithography step, comprising a local deposition of a resin pattern which serves as a protective mask over the access lines and the vertical nanowires; and
A step of dry etching by ion bombardment to remove the polysilicon layer at the undesirable locations.

According to a particular embodiment, the polysilicon layer has a thickness comprised between 20 and 200 nm.

According to a particular embodiment, the polysilicon layer has a thickness of about 100 nm.

Thus, this thickness range allows avoiding making the nanostructures too wide while allowing minimising the access resistances. According to another embodiment, the polysilicon may also be replaced by amorphous silicon. In general, it may consist of silicon.

According to another aspect, the present disclosure relates to a platform obtained by means of the aforementioned method.

According to another aspect, the present disclosure relates to a microprocessor comprising a platform obtained by the aforementioned method.

According to another independent aspect, the present disclosure relates to a microprocessor comprising a platform for cellular interfacing, comprising at least one nanoprobe based on nanowires each comprising a conductive end intended to come into contact with a cell, wherein the nanowires are directly built over the passivation layer of the microprocessor.

This object ensures good interfacing with cellular structures while ensuring effective capture of a signal originating from the interfaced cells.

According to a particular feature, an access line for accessing a nanowire allows connecting the nanowire directly to a transistor of the microprocessor through a via.

4. FIGURES

Other features and advantages will appear more clearly upon reading the following description of a preferred embodiment, given as a simple illustrative and non-limiting example, and from the appended drawings, wherein:

FIG. 1 describes the principle of the steps implemented for the manufacture of a platform according to the present technique;

FIG. 2 represents vertical nanowires obtained over a silicon substrate;

FIG. 3 represents vertical nanowires obtained over a quartz substrate;

FIG. 4 represents a vertical nanowire with a height significantly larger than that of the nanowires of the prior art;

FIG. 5 represents an interfacing platform comprising seven vertical nanowires, composed by nanowires structured directly in the bulk Si substrate, then covered with an oxide layer (SiO2) and a Poly-Si layer which is structured to form an electrode comprising 7 nanowires extended by an electrical access path; finally, this Si layer has been selectively silicided into PtSi;

FIG. 6 is a section view made on the electrode of FIG. 5 representing two vertical nanowires, revealing the stack of layers thus made according to the method of the invention;

FIG. 7 represents vertical nanowires obtained on a CMOS circuit passivation layer. The nanowires, made of SiOx, are structured in the final passivation layer of the circuit and are covered with an amorphous Si layer (~90 nm);

FIG. 8 represents an electrode with 3 nanowires where a localised deposition by electrochemistry of a conductive organic material (PEDOT:PSS) has been carried out;

FIG. 9 schematically represents the different steps of the method of the invention;

FIG. 10 schematically represents the different steps of the method of the invention implemented in the passivation layer of a CMOS circuit;

FIG. 11 is a section of a probe and of a via for reaching a pixel of a CMOS circuit as implemented by the present technique;

FIG. 12 represents a set of nanoelectrodes on HDCMOS as implemented by the present technique;

FIG. 13 represents nanowires on quartz as implemented by the present technique;

FIG. 14 represents nanowires on quartz with PtSi as implemented by the present technique;

FIG. 15 represents, in a larger view, nanowires on quartz with PtSi as implemented by the present technique;

FIG. 16 represents, in a closer view, a nanowire on quartz with PtSi, reporting the different measurements of this nanowire, as implemented by the present technique;

FIG. 17 represents a nanowire on quartz with Si as implemented by the present technique.

5. DETAILED DESCRIPTION

As explained before, the prior techniques suffer from problems related in particular to the repeatability of manufacture and to the implementation of the manufacture of the platforms on an industrial scale, these two constraints being important in order to offer economically interesting products. More particularly, the prior technique consisting in attacking an active surface of a substrate to form the nanoprobes therein certainly allows obtaining satisfactory results, but suffers from random results related to the inconstancy of the thickness of this active layer that is attacked and to variations of the attack rates itself in directive plasma etching.

For example, when the active layer of the substrate to be etched is supposed to measure 5 μm, the prior method consists, firstly, in attacking this active layer, for example over 4 μm, so as to deliver a remaining layer (for example for an access line) with a thickness of 1 μm and nanoprobes with a given height (height of at most the thickness of the active layer to be etched). Yet, when the thickness of the active layer is different and fluctuating over the surface of the substrate, the thickness of the finally obtained active layer (for example of the access line) is no longer constant: it can vary from one location to another of the substrate by several hundred nanometres. This is problematic because, at this thickness (hundreds of nanometres), the electrical characteristics of the platform (for example the electrical characteristics of the access line or that of the nanoprobe) vary according to the thickness. It follows that the performed electrical measurements are substantially distorted and/or reliable depending on the final thickness of the active layer once "structured". As indicated before, for a theoretical thickness of 5 μm (5 micrometres), the thickness variation may be of more or less 500 nanometres. Returning back to the example of an access line, the thickness of the latter can therefore theoretically vary from 0 to 1.5 μm, which is potentially harmful in terms of manufacturing consistency and repeatability.

To overcome this original problem, the Inventors have had the idea of developing a new manufacturing method which provides more consistency in the height of the components formed over the platform and relieves from the constraints of the structuring of a layer whose thickness is directly related to the dimensions of the manufactured nanostructures. In this new method, the manufacturing paradigm is reversed so as to provide a certain repeatability of the components: the active layer (i.e. the one in which the nanostructure is made, up to the insulator) is no longer the one used for nanostructuring. More particularly, instead of wishing to structure an active layer that is added over the substrate (in the case of a SOI or SOQ substrate) or to the pixels of the CMOS (in the case of integration on an electronic circuit), as is conventionally the case of prior methods, the invention consists in structuring the upper portion of a very thick layer (i.e. a bulk substrate, of silicon, quartz, flexible substrate), then in depositing thereon an active layer with a controlled thickness in the range of one hundred nanometres according to a predetermined method. This deposition of an active layer allows ensuring the consistency of the thickness of this deposition and therefore ensuring that the electrical characteristics of the different devices of the platform are constant.

Referring to FIG. 1, in general, the proposed manufacturing method thus comprises, subsequently to obtaining a substrate suitable for the desired function:

a step (E10) of structuring the substrate, to create therein the topology of nanoprobe structures;

a step of depositing a SiO2 layer, where necessary;

possibly, a step (Eo20) of depositing an insulating layer when the substrate is conductive (case of silicon or carbon or any other semiconductor or metal, for example);

a step (E30) of depositing an active layer over this substrate, according to a model suited to the function intended for the devices of the platform; the thickness of the deposited active layer is controlled and ensures the repeatability of the obtained platforms; the deposited active layer is for example silicon (polycrystalline silicon, also called poly-Si by LPCVD or low temperature amorphous silicon by PECVD);

a step (E40) for defining the electrodes;

a step (E50) of depositing a probe interface layer;

In other words, silicon is deposited in order to be able to carry out a controlled approach in nanoelectricity which is selective silicidation (as carried out hereinafter), the silicon layer is structured, then metal is deposited everywhere, which during a thermal activation reacts (Si-Metal alloy) only at the locations where it is in contact with the silicon. Thus, during a so-called selective chemical etching, the metal is removed from the unreacted areas without attacking the formed alloy. The advantage is that there is no lithography step to perform; One could instead deposit a metal directly, then perform a resin masking and etching the metal over the areas not protected by the resin; This approach is less common in Si microelectronics foundries, but could still be considered;

a step (E60) of structuring the metallic access lines;

a step (E60) of depositing an insulating layer;

a step (E70) of selective removal of the insulating layer (for example over the nanoprobes or any other suitable location depending on the considered platform).

Thanks to the orderly implementation of these steps, it is possible to obtain probes all of them having the same dimensions (i.e. having the desired heights) for capturing biological phenomena, while guaranteeing the thickness of the access lines (and therefore guaranteeing constant electrical characteristics) and ensuring high repeatability (and therefore an implementation on an industrial scale). In addition, the access lines are more homogeneous and less high: they are therefore no longer "guiding" for the cells in culture, which has a definite advantage in terms of the natural development of the biological sample over the platform.

Moreover, since the described techniques are based on a "raw" substrate (i.e. comprising no active layer), it is possible to define different probe heights depending on the desired use. More particularly, it is possible to define probes with different heights depending on the location on the same platform. It is also possible to define probe heights larger than those of prior art (limited by the thickness of the active layer).

The described technique implements a structuring of the nanoprobes directly over a bulk substrate (Si or quartz for example). It allows implementing this technology in a very simple manner on substrates of great interest, like transparent substrates (quartz) or flexible substrates, which are substrates of choice for in vivo applications.

The described technique allows obtaining a maximum chip manufacturing yield: the thickness of the access lines corresponds to the thickness of the silicon deposited (between 50 and 200 nanometres, for example 100 nm) by CVD where the thickness variation by less than 2% on the scale of the entire substrate. The thickness of the deposited silicon should be relatively thin in order to avoid increasing the diameters of the nanostructures too much by the successive thicknesses deposited over the structures.

Referring to FIGS. 2 to 8, a partial view of a platform of nanoprobes obtained through the previously-described method is described.

FIG. 2 shows the result of direct structuring over a bulk silicon substrate, before implementation of the surface treatment, insulation and structuring steps. In this FIG. 2, seven silicon nanowires are represented, a focus being made on one of these nanowires, with a height of 3.472 μm and with a diameter of 458 nm. FIG. 3 shows the result of direct structuring over a bulk quartz substrate, before implementation of the surface treatment, insulation and structuring steps. In this FIG. 3, four quartz nanowires (transparent) are represented. They have a height of about 5.90 μm and a diameter in the range of 2 μm. FIG. 4 discloses a Si nanowire with a height of about 13 μm, well above the conventional height reachable with prior methods. FIG. 5 illustrates a portion of a platform comprising seven nanowires and an access line upon completion of the implementation of the previously-described method. The 5 μm scale shown in FIG. 5 allows gauging the constant thickness of the access line. FIG. 6 is a cross-sectional view of two nanowires with identical height upon completion of the implementation of the previously-described method. FIG. 7 represents seven nanowires etched in a CMOS chip passivation dielectric layer, a focus being made on one of these nanowires, with a height of 2.22 μm and a diameter of 520 nm. The nanowires are covered with an amorphous Si layer deposited by PECVD at low temperature (200° C.).

FIG. 8 represents an electrode with 3 nanowires where a localised deposition by electrochemistry of a conductive organic material (PEDOT:PSS) has been carried out.

Referring to FIG. 9, the detailed steps for manufacturing a platform according to an embodiment of the above-described manufacturing method are disclosed. In the left part, a top view (U.V.) of the substrate and in the right part a side view (L.V.) of the substrate are represented.

More particularly, referring to FIG. 9, the manufacturing method comprises the following steps, which are carried out on a base comprising a silicon (Si) substrate (Sub):

manufacturing (10) vertical nanowires: vertical structuring of the platform;

this manufacture is based on a photolithography technique, comprising a local deposition of a resin pattern which serves as a protective mask (resistant nanoplot with a 500 nm diameter), using a conventional organic resin (for example like ex: IEC 3012); and plasma etching (ICP-RIE deep reactive ion etching) at the desired height (from 1 to 20 μm): dry etching by bombardment of ions (derived from a plasma); this technique has the advantage of a strong anisotropy of the etching: the boundary between the etched and non-etched areas is most of the time rectilinear and vertical; the remaining resin is removed by chemical etching (resin derived from the previous sub-step);

upon completion of this first step, one obtains vertical nanowires over the platform, forming groups consisting of 1 to 100 nanowire(s) and distributed over the platform, which are reworked in the next steps in order to confer the expected properties thereon;

optionally, an insulating layer (thermal oxidation (11) on Si or oxide deposition) of the entirety of the nanostructured substrate to obtain an insulating layer with a thickness of about 100 nm (this step is necessary only on silicon or other conductive substrate in order to be able to insulate the electrodes from one another);

creation (12) of the access lines:

Full-wafer silicon deposition by CVD; Indeed, LPCVD: allows obtaining poly Si but at a temperature between 500° C. and 600° C.—a temperature which is not compatible with integration on CMOS, or on flexible substrates. As regards the PECVD, amorphous Si, deposited between 200° C. and 300° C. The Si is a little less qualitative than by LPCVD (presence of hydrogen in the layer) but the Inventors have pointed out that this is enough to be able to make the Pt or Ni alloy (the selective silicidation approach described later on);

photolithography, comprising a local deposition of a resin pattern which serves as a protective mask (micrometric patterns defining the electrical contacts connecting the nanoprobes), using a conventional organic resin whose thickness is larger than the length of the nanostructures (for example like ex: AZ4562); and RIE etching: dry etching by bombardment of ions (derived from a plasma); this technique has the advantage of a strong anisotropy of etching: the boundary between the etched and non-etched areas will most of the time be rectilinear and vertical; all nanostructures being protected by the resin, the remaining resin is removed by chemical etching (resin derived from the previous sub-step) the Si sheath over the nanostructures is not etched;

upon completion of this first step, there is a group of nanostructures over a bulk Si substrate covered with an insulating layer and a Si layer. Over the nanostructures, there is a Si sheath then a SiO2 sheath and finally the Si core. The bulk Si substrate is covered with an SiO2 insulator over which access lines are structured in the deposited Si layer allowing addressing the different groups of nanostructures independently;

Selective creation of an Si-metal alloy: example of silicidation (13) of platinum (it is also possible to carry out the same approach conventionally with Ni—and other metals Ti, etc.—Ni allows carrying out the silicidation reaction at a lower temperature (interesting for more temperature-sensitive substrates)):

to create low resistive areas and improve the interface between the nanoprobe and the liquid environment, a step of full-wafer isotropic deposition of platinum (Pt) is performed by PVD (standing for "Physical Vapour Deposition");

an activation annealing (400° C., for 4 minutes) allows creating afterwards the PtSi alloy; The advantage herein is that the PtSi is created only when the Pt is in direct contact with the Si and not with SiO2: the used technique therefore allows having PtSi only at the desired locations, thereby allowing preserving the measurement sensitivity thereof; this is a diffusion process therefore exponential with temperature. It takes some time at a given temp to convert a layer with a thickness e. If the temperature is higher, it will be quicker. If the layer is thicker it will take more time. 400° C./4 min allows converting a 60 nm layer of Pt, which is suitable for the intended use.

Consequently, it is not necessary to carry out a lithography step for implantation on the metal: there is no need to cover some areas with resin. In addition, this platinum silicidation step allows considerably increasing the integration of the nanoprobes, while enabling a strong biocompatibility with the living environment and that being so thanks to the activation annealing of platinum on Si. This step may be carried out with other metals like Ni (which has a lower alloy formation temperature), Ti . . .

selective etching (14) of Pt with respect to PtSi with aqua regia (chemical mixture of HCl: HNO3: EDI which allows etching the metal alone: the silicide is not attacked):

this consists of a selective chemical etching step which allows etching the non-transformed Pt (derived from the previous step) without attacking the PtSi: the Pt (non-transformed) is therefore removed from the SiO2;

The interest of PtSi is twofold: from the nanoprobe perspective, it does not oxidise (compared to Si alone) and allows maintaining a low electrolyte/probe interface impedance over time.

metallisation (15) with aluminium (Al) allowing reducing the resistance of the access lines:

a conformal deposition over the entire Al platform (500 nm) followed by photolithography and chemical etching of the Al not protected by the "etch-back" resin is implemented afterwards to metallise the access lines;

Al is kept only over the access lines. The remaining resin is chemically removed;

insulation (16) of the platform from the environment:

An oxide (insulation oxide) is deposited afterwards in a conformal manner to insulate the nanowires from the platform: the used oxide may be SiO2, Al2O3 or HfO2, or a specific dielectric;

A selective removal of this insulating oxide is performed afterwards on the nanowires themselves;

finally, an additional conductive layer may be selectively deposited over the nanostructure by electrochemical deposition like a conductive organic layer (PEDOT: PSS) or metal oxide (IrOx, RuOx) in order to be able to modify the interface properties of the nanoprobes.

In an alternative application of this embodiment, described with reference to FIG. 10, the previously-described method is implemented on a chip of the CMOS circuit type. The steps are substantially identical to those described with reference to FIG. 9. More particularly, in this configuration, the dielectric passivation layer of the CMOS chip is used as a bulk substrate, allowing building the nanowires (photolithography, plasma etching) directly over this dielectric passivation layer then creating the access lines, silicidation (etc.) without having to address the metallic pixels.

In FIG. 10, CMOS pixels are represented (Pix), in a schematic sectional view. According to this variant, the nanoprobes are built above selected pixels then connected during step 15 of Al metallisation of the access lines through a metallised via (through opening) thereby connecting each selected pixel of the CMOS chip to its associated nanoprobe. More particularly, in this embodiment, a specific scheme (pattern) is used to ensure that the metallised access lines of the nanoprobes come into direct contact with the pixels of the chip. For example, this scheme is provided by the manufacturer of the chip (when the latter is premanufactured ahead). Afterwards, the scheme is used during the step of vertical structuring of the platform to not only create the vertical nanowires, as explained before, but also to perform a complete opening (via) of the passivation layer, according to the provided scheme, above pixels with which the access lines should be connected. Once this contact resumption by metallisation has been performed, the insulation (16) of the platform from the environment is carried out, which allows insulating the structured passivation layer of the CMOS again and restoring the original properties of the CMOS. Afterwards, a selective removal of the insulation layer is performed on the nanoprobes. Thus, it is possible to create a platform of nanoprobes directly over an electronic component in charge of performing all or part of the processing of the electrical signals transiting through these nanoprobes.

Thus, the CMOS technology is directly used to develop a platform that can perform large-scale cellular and parallel neural coupling. For example, the number of nanowire recording sites can be significantly high, and this network of nanowires is made "active" by manufacturing it above the CMOS integrated circuit. The nanowires in each recording site are connected to their own amplifier and stimulator in the underlying integrated circuit (i.e. the integrated circuit itself assumes a network structure with a number of amplifiers and/or stimulators equivalent to the number of nanowires of the platform. The on-chip electronics in the integrated circuit can be used to serve several purposes. Firstly, it makes the large-scale operation of the network of nanowire sites in parallel possible. Secondly, the on-chip electronics proximate to the nanowires allows increasing the recording sensitivity, for example by avoiding an excessively long path of the signals towards the electronics, such a path possibly attenuating the signal or introducing noises. Thus, such a platform on CMOS can be used for intracellular and massively parallel recording and stimulation of in vitro dissociated cultures of cell networks. Such a platform can also be used in the study of neural networks in vivo and the development of new types of neuroprostheses. As set out before, the advantage of the proposed platform, in particular obtained with the disclosed manufacturing method, lies in the very low manufacturing variability, actually enabling a scale-up and a reduction in manufacturing costs.

Complementarily, the invention also relates to a platform for cellular interfacing, manufactured over a predetermined bulk substrate using the previously-described method. In particular, such a platform is remarkable in that the silicon layer deposited subsequently to the creation of the vertical nanowires directly over the substrate has a thickness comprised between 20 and 200 nm; with a preferred thickness around 100 nm. Such a platform may also comprise, depending on the production conditions, groupings of vertical nanowires into clusters, so as to produce predefined groups for cell measurement over the same platform. Advantageously, the platform may be specialised according to the biological materials to be studied/stimulated. More particularly, the positioning and the spacing of the vertical nanowires is determined and selected according to the types of cells to be interfaced, and in particular the size of these cells. In addition, the surface of the platform may be treated so as to define hydrophilic/hydrophobic areas enabling a more accurate placement of the studied cells and therefore enabling a better interfacing of these cells. Moreover, the height of the nanowires over these platforms is comprised between 2 and 20 μm. The height of these nanowires is, like their number and their spacing, determined according to the types of cells to be interfaced, but also the environment in which these cells are immersed in order to guarantee their life/survival during the study phase. Moreover, according to the present disclosure, the height of the nanowires may be different over the same platform, and that being so in order to enable several different types of cells to be able to be integrated within the same cultures and/or to be able to interface several layers of cells from the same biological sample, thereby ensuring measurements under different operational conditions, while allowing maintaining, to some extent, a single cell type resolution.

FIG. 11 shows a cross-sectional view of a nanowire and of the via which have been manufactured over the passivation layer of the HDCMOS according to the technique proposed before. FIG. 12 represents a set of HDCMOS on-chip probes that have also been manufactured by the Inventors.

FIG. 13 is a view of a set of nanowires manufactured over a quartz layer. FIG. 14 is a view of a set of nanowires manufactured over a quartz layer with a layer of the PtSi alloy. FIG. 15 is a view of a set of nanowires manufactured over a quartz layer with a layer of the PtSi alloy. FIG. 16 is a closer view of a nanowire manufactured over a quartz layer with a layer of the PtSi alloy, specifying the dimensions of this nanowire. FIG. 17 is a view of a set of nanowires manufactured over a quartz layer with a Si layer.

Thus, as it is prevalent in light of the elements set out hereinabove, the Inventors are in possession of a mastery of the described technology, allowing in particular considering many variations both in terms of size and density of the nanowires, in particular built over a HDCMOS substrate. Moreover, to date, no HDCMOS chip embedding cellular interfacing platforms over their substrates has been disclosed in the prior art, the Inventors believe that they are the only ones to have such a microprocessor comprising a platform for cellular interfacing, this platform comprising at least one nanoprobe based on nanowires each comprising a conductive end intended to come into contact with a cell, in which processor the nanowires of the nanoprobe are directly positioned and built over the passivation layer of the microprocessor.

The invention claimed is:

1. A method for manufacturing a platform for cellular interfacing, the platform being manufactured over a predetermined bulk substrate, the method being a top-down method, characterised in that it comprises the following steps in order:

creating vertical nanowires over the bulk substrate;

depositing a Si layer;

creating access lines for accessing the nanowires;

selective silicidation of the access lines and of the nanowires;

metal structuring of the access lines;

depositing an insulating layer for liquid measurement;

selective removal of the insulating layer on nanoprobes.

2. The method for manufacturing a platform for cellular interfacing, according to claim 1, characterised in that the predetermined bulk substrate belongs to the group comprising: transparent substrate, flexible substrate, silicon, a passivation layer of a CMOS electronic circuit.

3. The method for manufacturing a platform for cellular interfacing, according to claim 1, characterised in that the step of creating the nanowires over the predetermined bulk substrate comprises:

a photolithography step, comprising a local deposition of a resin pattern which serves as a protective mask; and a step of dry etching by ion bombardment allowing obtaining the vertical nanowires on the substrate, at a desired height.

4. The method for manufacturing a platform for cellular interfacing, according to claim 1, characterised in that the step of selective silicidation of the nanowires is based on platinum, or nickel, or titanium, or chromium, optionally covered with a layer of a metal oxide (IrOx, RuOx) or an organic conductor (PEDOT: PSS) or a metal nitride (TiN, TaN).

5. The method according to claim 4, characterised in that the silicon layer has a thickness comprised between 20 and 200 nm.

6. The method according to claim 4, characterised in that the silicon layer has a thickness of about 100 nm.

7. The method for manufacturing a platform for cellular interfacing, according to claim 1, characterised in that the step of creating the access lines to the nanowires comprises:

A step of depositing a full-wafer silicon layer, by CVD;

A photolithography step, comprising a local deposition of a resin pattern which serves as a protective mask over the access lines and the vertical nanowires; and dry etching by ion bombardment to remove the silicon layer at undesirable-locations.

8. The method according to claim 1, characterised in that the height of the nanowires is comprised between 2 and 20 μm.

\* \* \* \* \*